Patented May 16, 1939

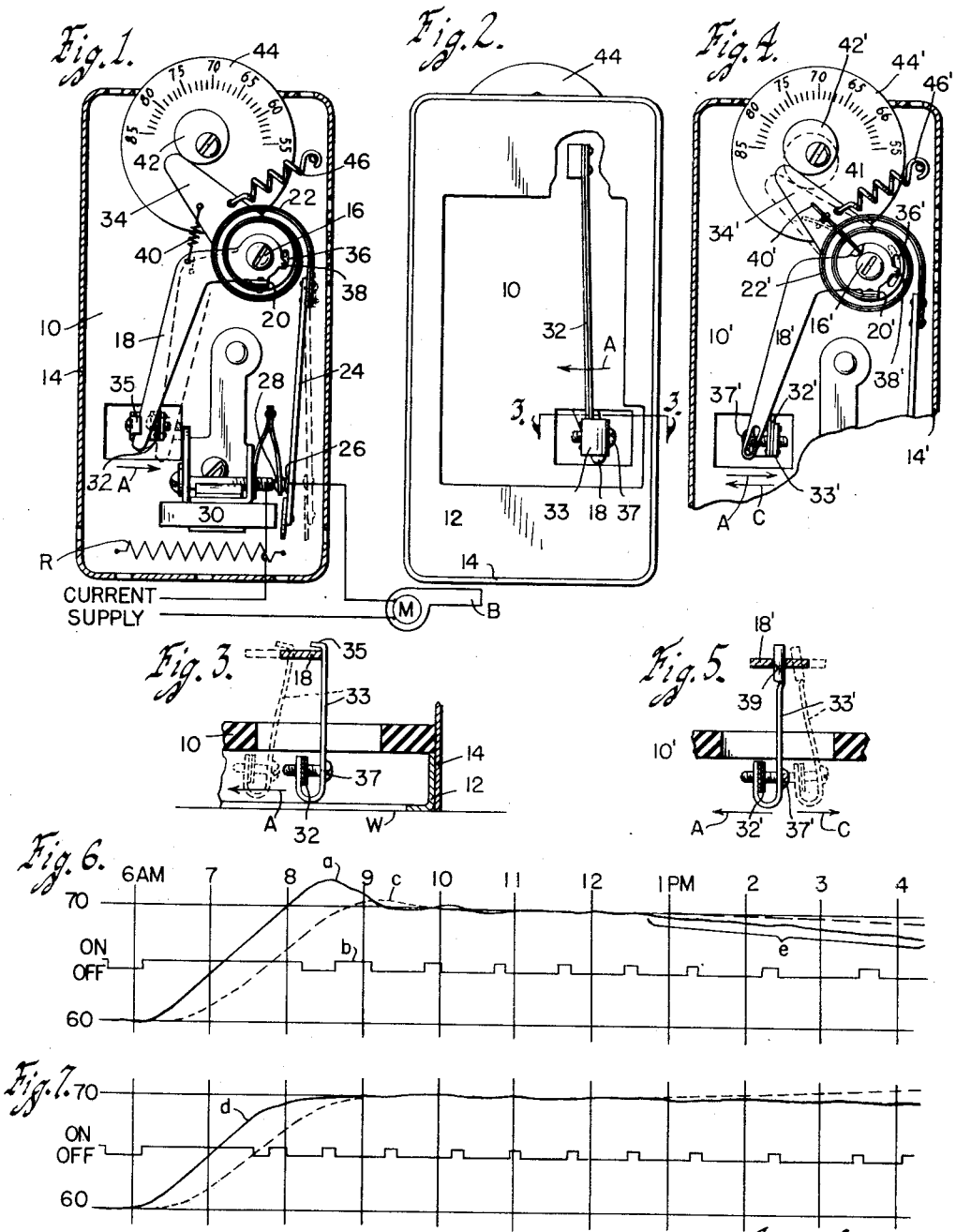

2,158,435

UNITED STATES PATENT OFFICE 2,158,435

WALL TEMPERATURE COMPENSATED ROOM THERMOSTAT

Burton E. Shaw, Adel, Iowa, assignor to Penn Electric Switch Co., Des Moines, Iowa, a corporation of Iowa Application March 29, 1937, Serial No. 133,579

4 Claims. (Cl. 200—139)

An object of my invention is to provide a wall temperature compensated room thermostat of simple, durable and inexpensive construction.

A further object is to provide a room thermostat or similar automatic controlling device which is normally responsive to room or ambient temperature, and which has auxiliary means therein responsive to the temperature of the wall or other surface on which the thermostat is mounted, such auxiliary means being operative to modify the action of the thermostat so as to compensate for wall temperature whenever different than the room temperature.

A further object is to provide a room thermostat with a wall temperature compensated means whereby to prevent overruns of burner mechanism controlled by the room thermostat, which occur particularly when the room thermostat is adjusted from one setting to a higher setting.

Another object is to provide a room thermostat compensated for an increase in wall temperature resulting from solar radiation.

With these and other objects in view, my invention consists in the construction, arrangement and combination of the various parts of my wall temperature compensated room thermostat, whereby the objects contemplated are attained, as hereinafter more fully set forth, pointed out in my claims, and illustrated in the accompanying drawing, in which:

Figure 1 is a front elevation of a room thermostat embodying my invention, the cover thereof being shown in section.

Figure 2 is a rear elevation of the same.

Figure 3 is a sectional view on the line 3—3 of Figure 2 showing the wall temperature compensating means coacting with the control means in the room thermostat.

Figure 4 is a view similar to Figure 1 showing a slightly modified form of the invention.

Figure 5 is a sectional view similar to Figure 3 showing details of the modified form.

Figure 6 is a temperature and current graph of a burner installation using an ordinary room thermostat; and Figure 7 is a similar graphic view using my wall temperature compensate room thermostat.

On the accompanying drawing I have used the reference numeral 10 to indicate a switch base. A supporting back 12 is provided therefor, and a casing member 14 is provided for the front of the base. Within the casing 14, extending from the base 10, is a pivot bolt 16. Pivotally mounted on the bolt 16 is a bell crank arm 18 which has an upwardly extending lug 20 to which a temperature responsive element 22 is secured.

The element 22, by way of illustration, is shown as a spiral strip of bimetal. A switch arm 24 is secured thereto and carries a contact 26. This contact is engageable with and disengageable from a contact 28 for controlling the supply of current through a burner motor M of a burner B. A permanent magnet 30 is provided for giving snap action to the operation of the switch arm 24. Obviously the bell crank arm 18 can be rotated for changing the setting of the switch.

I provide a member 32, such as a strip of bimetal which is responsive to the temperature of the wall W (Figure 3) on which the room thermostat is mounted. The member 32 is associated with the arm 18 for changing the setting of the room thermostat in the following described manner.

A U-shaped strip of spring material, such as spring bronze 33 has one end secured to the member 32 and its other end hooked as indicated at 35 and contacting with the edge of the arm 18. An adjusting screw 37 is provided to secure a factory adjustment, this screw being operable to change the relative positions of the element 32 and the hook end 35 of the spring 33.

In Figure 1 the position of the parts shown in full lines is the position assumed thereby when the wall temperature is equal to the room temperature, this being termed "equilibrium conditions." Whenever the temperature of the wall is lower than the room temperature, however, the bimetal 32 will swing in the direction of the arrow A, for instance to the dotted position shown in Figures 1 and 3. The degree of movement, of course, will be dependent upon the difference between wall temperature and room temperature.

An adjusting lever 34 is provided for manually setting the position of the room thermostat. For the time being, we will consider this as stationary. It is provided with a slot 36 into which a lug 38 of the bell crank arm 18 extends. This lug is normally held in the full line position shown in Figure 1 by a light spring 40.

When the wall temperature actuated member 32 moves as described in response to a lower wall temperature than room temperature, the bell crank 18 is moved against the action of the spring 40 and the lug 38 moves in the slot 36. The slot could be made longer than illustrated to provide compensation for any difference between wall and room temperature, although preferably it is limited in length, corresponding to some three or four degrees difference. This limits the movement of the arm 18 so that after it stops in the dotted position of Figure 3, the connecting member 33 may bend backwardly, this member being of sufficiently thin leaf spring material to permit such overmovement of the member 32.

Manual adjustment of the room thermostat is secured by rotating a cam 42, a dial 44 being provided for this purpose. The lever 34 is retained against the cam 42 by a suitable spring 46. Whenever the lever 34 is swung to a colder position, it will carry the arm 18 away from the spring 33, while when it is adjusted to a warmer position, it will leave the arm 18 remain and stretch the spring 40 until the upper edge of the slot 36 engages the lug 38, whereupon the arm 18 will be swung and carry with it the spring 33, bending it as illustrated by dotted lines in Figure 3. This apparently throws the compensating means out of adjustment, but when the thermostat is adjusted for a warmer room teperature, soon thereafter the wall temperature will rise, also thus moving the member 32 to position corresponding to the new position of the lever 18. Likewise when the thermostat is adjusted for a colder position, soon thereafter the wall will cool down and the spring 33 will catch up with the arm 18, after which compensating operation occurs as already described.

Having described the room thermostat, I will now point out the desirability of such a thermostat.

In Figure 6 room temperature is indicated by a solid line, and wall temperature by a dotted line. The room temperature starts at about 60°, which is usually night setting for a room thermostat. Such setting can be secured, for instance, by energizing a resistance R in the thermostat casing for thus raising the ambient temperature and causing the thermostat to actually respond to a lower room temperature.

At the desired hour in the morning, the resistance R can be de-energized, whereupon the room thermostat will (after the heat has been dissipated from the resistance R) respond to a 70° room temperature. In Figure 6 the "on" and "off" periods of the burner are illustrated, and after the resistance R is de-energized, the burner will remain on until theoretically the room temperature reaches 70°. However, wall temperature always lags behind room temperature, as shown by the dotted lines, and therefore since the room thermostat is mounted on the wall, it will respond to a compromise temperature between wall temperature and room temperature, because actually it is responsive to both, majorly because the bimetal element 22 is mounted on the outside of the base 10, and minorly because the temperature of the base 10 is between wall temperature and room temperature. It should be remembered that in Figure 6 we are dealing with a standard room thermostat or one not compensated for wall temperature.

Accordingly, the temperature of the base 10 affects the operation of the room temperature responsive bimetal element and room temperature must actually rise to a higher degree than 72° before the thermostat will open the circuit of the burner.

It is well known that whenever the burner circuit is open, the room temperature will overrun and accordingly the burner may be cut off at about 72°, and the temperature actually overrun at 75°, as illustrated by the peak a of the room temperature graph line. Because the wall temperature is still lower than the room temperature, there will actually be another "on" period of the burner as indicated by the reference character b which aggravates the overrun and causes the wall temperature to overrun the room temperature, as indicated at c. This condition produces an underrun of the room temperature, and it is sometimes two hours or so before an equilibrium condition occurs so that thereafter the room temperature can be kept substantially constant.

Referring to Figure 7, when my wall compensated room thermostat is used, cut-off of the current to the burner will occur, for instance, at the point d, because the thermostat will respond to a lower than room temperature (68°) by having been compensated by the member 32 responsive to wall temperature, which may be 65°. Thus response of the element 32 at 65° and response of the element 22 normally to 70° makes an actual response of the element 22 to 68°, because the arm 18 has been moved from its normal full line position to a compensated position.

This will result in an early cut-off of the burner and usually one or two cut-ins of the burner while the room temperature curve rounds off from the first cut-off of the burner and until the wall temperature reaches the room temperature, whereupon a susbtantially constant room temperature will be secured during equilibrium conditions, during which there will be no compensation because the position of the member 32 will correspond to the position of the arm 18 as fixed by the setting of the thermostat. This eliminates all possibility of an overrun as illustrated in Figure 6 caused by wall temperature lagging behind room temperature.

Another wall temperature condition occurs which may be compensated for in a reverse manner. This condition is illustrated by the graph in Figure 6. In the afternoon when the solar radiation affects the walls of a house, the temperature of the wall will rise above the temperature of the air in the room. This will cause the ordinary room thermostat to actually operate at a lower room temperature than otherwise, because it is receiving some heat from the wall. This will result in a gradual decrease of the room temperature as illustrated by the portion e of the room temperature graph line in Figure 6, which of course is undesirable, as it is, on the other hand, desirable to keep the room temperature substantially constant.

In Figure 1 I have illustrated a room thermostat compensated for a wall colder than the room temperature. In Figure 4 I show one compensated for a wall which is either warmer or colder than the room temperature. Parts in Figures 4 and 5 corresponding to the parts in Figures 1, 2 and 3 have the same reference numerals with the addition of the symbol prime.

The spring 33' extends through an opening 39 in the arm 18' so that the bimetal element 32', whether moving toward the right or left, will swing the arm 18'. A leaf spring 40' has its lower end connected with the arm 18' and its upper end slidably confined between a pair of pins 41, thus tending to retain the arm 18' in a central position relative to the lever 34'. The slot 36' is elongated and the lug 38' is normally at the center of the slot.

Accordingly whether the bimetal member 32' swings toward the right or left, it will carry the arm 18' with it against the tension of the leaf spring 40'. It will carry the arm 18' in the direction of the arrow A when the wall temperature is lower than room temperature, but in the direction of the arrow C when the wall temperature is higher than the room temperature.

Thus, although the wall temperature will rise above the room temperature, as in Figure 7, during the hours when the wall is affected by solar radiation, the room temperature will remain substantially constant due to the compensation afforded by the wall temperature responsive member 32'.

During manual adjustment of the room thermostat, the lever 34' may be swung, for instance, toward the dotted position illustrated in Figure 4, and will merely bend the spring 40' in one direction, while when it is adjusted in the opposite direction, the spring likewise will be bent in an opposite direction. When equilibrium conditions are obtained after such change of setting, the arm 18' will be swung by the element 32' to central position again.

With the disclosed thermostat, it is obvious that when there is no wall temperature differential, there is no compensation. However, when the wall is either colder or warmer than the room temperature, compensation occurs for preventing overrun and underrun of the burner. The condition illustrated in Figure 6 is aggravated by low mounting of the room thermostat; that is, mounting of the thermostat at a distance of two or three feet from the floor, to secure substantially constant temperature at table level. With a compensating means as I disclose, however, the thermostat can be mounted low and is completely successful, all overruns and underruns of room temperature being eliminated by compensating the thermostat for wall temperature. Overruns of this character could be eliminated if the room thermostat were mounted away from the wall where it is not responsive to the wall temperature, but that, of course, is impractical and consequently by compensating the thermostat for wall temperature, the desirable control of the burner for substantially constant temperature operation without overrun and underrun can be secured.

Some changes may be made in the construction and arrangement of the parts of my wall temperature compensated room thermostat without departing from the real spirit and purpose of my invention, and it is my intention to cover by my claims any modified forms of structure or use of mechanical equivalents which may be reasonably included within their scope.

I claim as my invention:

1. In a wall temperature compensated room thermostat, means responsive to room temperature and means for varying the operative position thereof in accordance with a wall temperature different than the room temperature by setting the room thermostat for lower temperature operation when the wall temperature decreases and vice versa.

2. In a wall temperature compensated room thermostat, a casing for mounting on a wall, control means therein normally responsive to room temperature and auxiliary means adjacent the back of said casing and responsive to wall temperature and operative to modify the action of said control means by setting it for lower temperature operation in accordance with a decrease in wall temperature.

3. In a room thermostat, a casing for mounting on a wall, a control switch therein, means responsive majorly to room temperature and minorly to wall temperature and means for compensating said control switch for wall temperature comprising means responsive majorly to wall temperature and operative to modify the operation of said control switch to respond to a lower room temperature in accordance with reduced wall temperature.

4. In a device of the class described, a room temperature responsive means and wall temperature responsive means operable to change the setting of the room temperature responsive means to a higher temperature when the wall temperature increases and thereby compensate the room temperature responsive means for different wall temperatures than the room temperature.

BURTON E. SHAW.